United States Patent [19]

Henkelman, Jr.

[11] Patent Number: 4,780,893
[45] Date of Patent: Oct. 25, 1988

[54] BIT SYNCHRONIZER

[75] Inventor: John R. Henkelman, Jr., Palm Bay, Fla.

[73] Assignee: Harris Corporation, Melbourne, Fla.

[21] Appl. No.: 39,147

[22] Filed: Apr. 16, 1987

[51] Int. Cl.⁴ .............................................. H04L 7/02
[52] U.S. Cl. ...................... 375/120; 375/83; 329/122
[58] Field of Search ............... 375/120, 110, 106, 81, 375/82, 83, 87, 119; 331/1 A, 1 R, 25; 329/112, 122

[56] References Cited

U.S. PATENT DOCUMENTS

| | | | |
|---|---|---|---|
| 3,778,550 | 12/1973 | David et al. | 375/119 |
| 4,232,387 | 11/1980 | Cottatellucci | 375/110 |
| 4,288,874 | 9/1981 | Yamada | 375/119 |
| 4,355,398 | 10/1982 | Cook | 375/110 |
| 4,387,342 | 6/1983 | Grosjean | 375/120 |
| 4,389,727 | 6/1983 | Rouffet | 375/110 |
| 4,635,280 | 1/1987 | Smith et al. | 375/120 |

OTHER PUBLICATIONS

Textbook entitled "Digital Communications by Satellite", pp. 429–438, Author, J. J. Spilker, Jr.

Primary Examiner—Robert L. Griffin
Assistant Examiner—Marianne Huseman
Attorney, Agent, or Firm—John L. DeAngelis, Jr.

[57] ABSTRACT

A bit synchronizer for producing a clock signal and synchronizing the clock signal to a digital data stream. The digital data stream is used to generate first and second bit rate clocks, each of which have a clock cycle time equal to one bit time. The first bit rate clock is input to a phase lock-looped for comparison with an internally generated clock. The internally generated clock, once phase locked with the first bit rate clock, controls a sampler that decodes the digital data stream. The locally generated clock is high at the mid-point of each bit interval and thus it is input to the sampler such that the sampler samples the digital data stream for decoding at the midpoint of each bit interval. The second bit rate clock, which lags the first bit rate clock by 90°, is input to a phase shifter. The phase shifted signal is compared with the locally generated clock. When the locally generated clock and the shifted second bit rate clock are in phase a locked condition is indicated.

9 Claims, 9 Drawing Sheets

BIT SYNCHRONIZER

FIELD OF THE INVENTION

This invention relates to a bit synchronizer for synchronizing a clock signal to an input data stream.

BACKGROUND OF THE INVENTION

The transmission of information in digital form, whether in a baseband or a modulated format, requires the generation of a clock signal at the receiver to ensure accurate detection of the transmitted information. Devices that produce such a clock signal and synchronize it to the incoming data stream are referred to generally as bit synchronizers. For those data formats that do not have a spectral line component at the bit rate or any of its harmonics, it is necessary to somehow extract the clock signal from the incoming data stream. It is also desirable to design the bit synchronizer such that its operation is not limited to a single data frequency or rate, but rather is easily adaptable to different bit rates.

Figure 1:
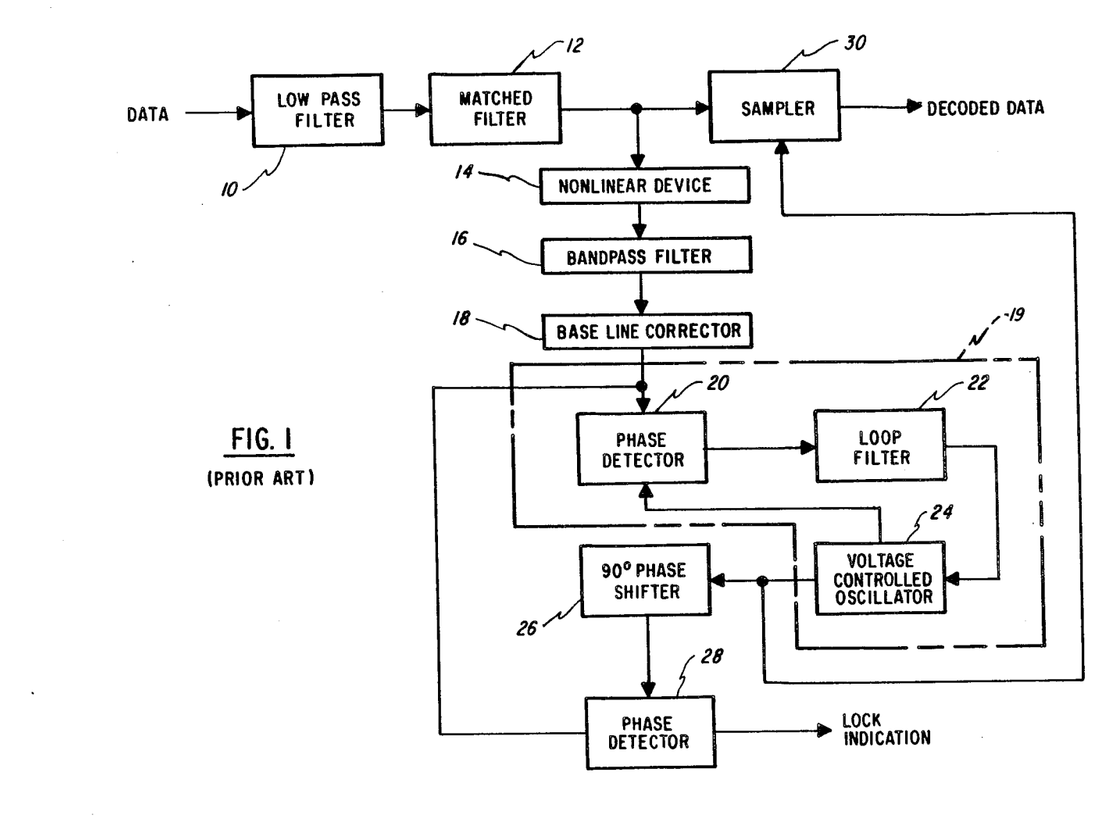
FIG. 1 is a block diagram of a prior art bit synchronizer.

A prior art bit synchronizer is illustrated in FIG. 1. An incoming data stream is provided as an input to a low pass filter 10 for removing high-frequency noise and unwanted demodulation frequency components that may be present in the data stream. The low-pass filtered signal is input to a matched filter 12 for providing an output signal that is maximized at a particular time during each bit interval. Ideally, this maximization point is the mid-point of each bit interval.

To provide the synchronized clock signal for data decoding, the output signal from the matched filter 12 is input to a non-linear device 14; for example a square-law device such as a rectifier. The resultant signal is filtered by a bandpass filter 16 and baseline corrected in a baseline corrector 18 to compensate for any baseline drift. Because the bandpass filter 16 inherently provides ac coupling, the baseline corrector 18 is required to re-establish the baseline.

In conjunction with the bandpass filter 16 and the baseline corrector 18, a frequency component is generated at the bit rate (R). The corrected signal is then input to the phase-locked loop 19, including a phase detector 20, a loop filter 22, and a voltage controlled oscillator 24. In the phase detector 20 the corrected signal from the baseline corrector 18 and the local oscillator signal from the voltage controlled oscillator 24 are compared and a phase error signal ($\theta_{E1}$) is generated for controlling the voltage controlled oscillator 24 via the loop filter 22. Specifically the phase detector 20 phase compares two signals A (the local oscillator signal) and B (the signal from the baseline corrector 18). Since the phase-locked loop 19 imparts a 90° phase shift to the input signal, the phase detector 20 performs a comparison cos A·sin B=($\frac{1}{2}$)(sin(A+B))+($\frac{1}{2}$)(sin (A−B)). The resultant signal is filtered by the loop filter 22 and reduces to $\theta_{E1} \approx \sin(A-B)$ for small phase errors. Thus as the phase of A approaches the phase of B, $\theta_{E1}$ goes to zero, and the local oscillator signal, lacking a control signal, remains constant (in phase and frequency).

The local oscillator signal from the voltage controlled oscillator 24 is also input to a sampler 30 for controlling the sampler 30 such that bit decisions are made at each mid-bit interval, to minimize the bit error rate in the decoded data signal. The phase shifted signal from the 90° phase shifter 26 should ideally be 90° out of phase with the baseline corrected signal from the baseline corrector 18.

Specifically, the phase detector 28 phase compares two signals B (the signal from the baseline corrector 18) and C (the signal from the 90° phase shifter 26). The comparison produces $\theta_{E2}$=cos B·cos C=($\frac{1}{2}$)(cos(B+C))+($\frac{1}{2}$)(cos(B−C)), which reduces to 1 as the phase of B approaches that of C. Thus the lock indicator produces a lock indication signal (i.e., a 1) when the phases of B and C are equal.

There are several disadvantages associated with this prior art design. For example, any device used as the non-linear device 14 will exhibit some temperature dependency. Also, if the prior art bit synchronizer is to be used in a multiple rate environment, it will be necessary to use a different 90° phase shifter 26 for each rate and also a different bandpass filter 16 for each rate. As previously mentioned, the use of ac coupling requires inclusion of the baseline corrector 18. Lastly, it is necessary to use the matched filter 12 so that the non-linear device 14 will produce a sufficiently large component at the bit rate to which the phase locked loop 19 can lock.

SUMMARY OF THE INVENTION

These and other disadvantages associated with the prior art bits synchronizers are overcome by the advantageous features of the present invention. The present invention differs from the prior art in that the process of generating a clock signal and synchronizing it to the data stream is accomplished without first passing the data stream through a matched filter and a non-linear device. The technique of the present invention generates the clock signal and synchronizes it to the data stream by operating on the data stream directly, rather than passing it through a low-pass filter and matched filter as in FIG. 1. Because this invention generates the clock signal using strictly digital techniques it can be easily reconfigured for different data rates by selecting the proper delay line, and thus the proper delay, that is required to generate and synchronize the clock signal.

According to the inventive features of the present invention, the data stream is input to a circuit for squaring-up the edges of the data pulses. The square data pulses are then used to generate a clock signal at the bit rate. The clock signal is input to a phase-locked loop for synchronizing an internally generated clock signal with the bit rate clock. The synchronized clock signal is fed to a sampler where the synchronized clock signal causes the data stream to be sampled and thus decoded at the midpoint of each bit. The clock signal is also phase shifted and compared with the synchronized clock signal in a phase detector. This phase detection process provides an indication of a locked condition.

In the preferred embodiment, the generation of the bit rate clock signal is accomplished with delay cables to provide the required delayed signals. In another embodiment, the delay could be provided by a microstrip delay line, especially for high data rates. The invention allows bit synchronization for multiple rate data streams by simply selecting the required delay cable (or microstrip) length.

With this invention, the disadvantages of the prior art are avoided. It is unnecessary to employ a matched filter, a non-linear device, and a baseline corrector. Thus all the problems created by these devices (e.g., temperature instability and added expense) are avoided. Further the bit synchronizer of the present invention can provide bit synchronization for any encoding scheme, for example, non-return to zero, return to zero, Miller, and Manchester, at variable data rates. The variable data rate aspect of the invention is provided by the use of delay cables and the generation of the bit rate clock directly from the data stream.

BRIEF DESCRIPTION OF THE DRAWINGS

The invention may be better understood, and the further advantages and uses thereof more readily apparent, when considered in view the following detailed description of exemplary embodiments, taken with the accompanying figures in which.

DESCRIPTION OF THE PREFERRED EMBODIMENTS

Figure 2:
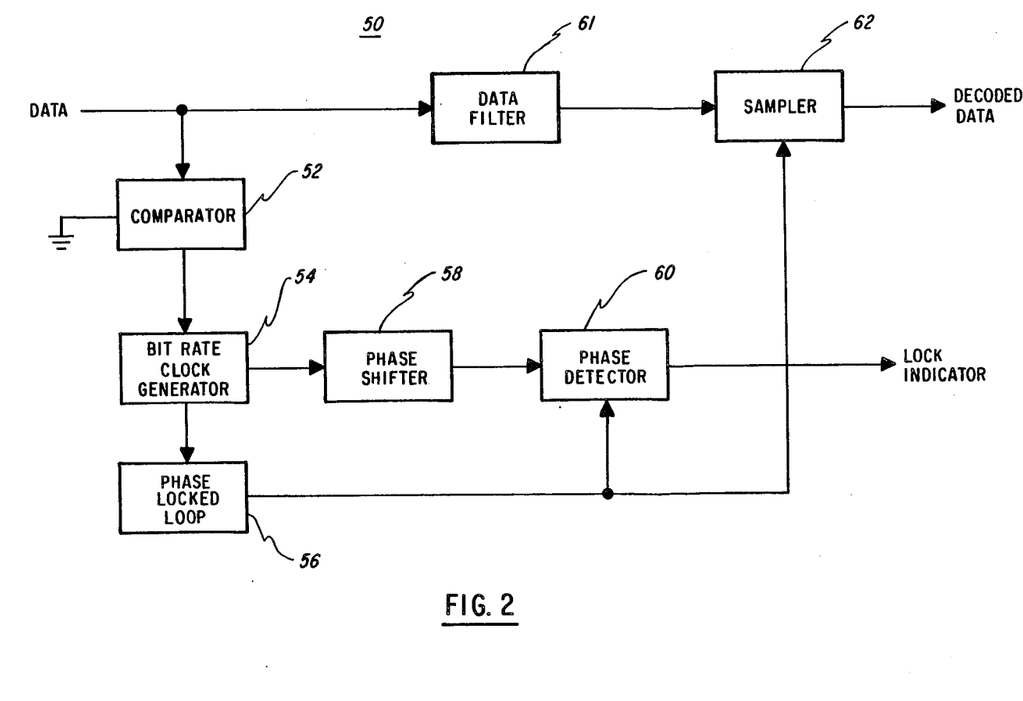
FIGS. 2 and 3 are block diagrams of bit synchronizers constructed according to the teachings of the present invention.

FIG. 2 illustrates a bit synchronizer 50 constructed according to the teachings of the present invention. The data stream is input to a circuit 52 for squaring the edges of the data symbols. The output signal from the comparator 52 is input to a bit rate clock generator 54 for producing one clock pulse during each data symbol interval. The clock signal from the bit rate clock generator 54 is input to a phase-locked loop 56 where it is compared with an internally-generated oscillating signal. The phase-locked loop 56 is constructed such that the loop is in a locked condition when the internally generated oscillating signal is 90° out of phase with the clock signal from the bit rate clock generator 54.

The clock signal from the bit rate clock generator 54 is also phase shifted by 90° in a phase shifter 58 and compared with the internally generated clock signal from the phase-locked loop 56 in a phase detector 60. When both signals input to the phase detector 60 are in phase, the output signal therefrom has a constant dc value indicating a locked condition. The locked signal from the phase-locked loop 56 also controls a sampler 62. The data stream is filtered by a data filter 61 and, the sampler 62 decodes the data stream under control of the phase-locked loop clock signal. In this manner, the data stream is sampled at each mid-bit position to maximize the decoding accuracy and minimize the bit error rate.

Figure 3:
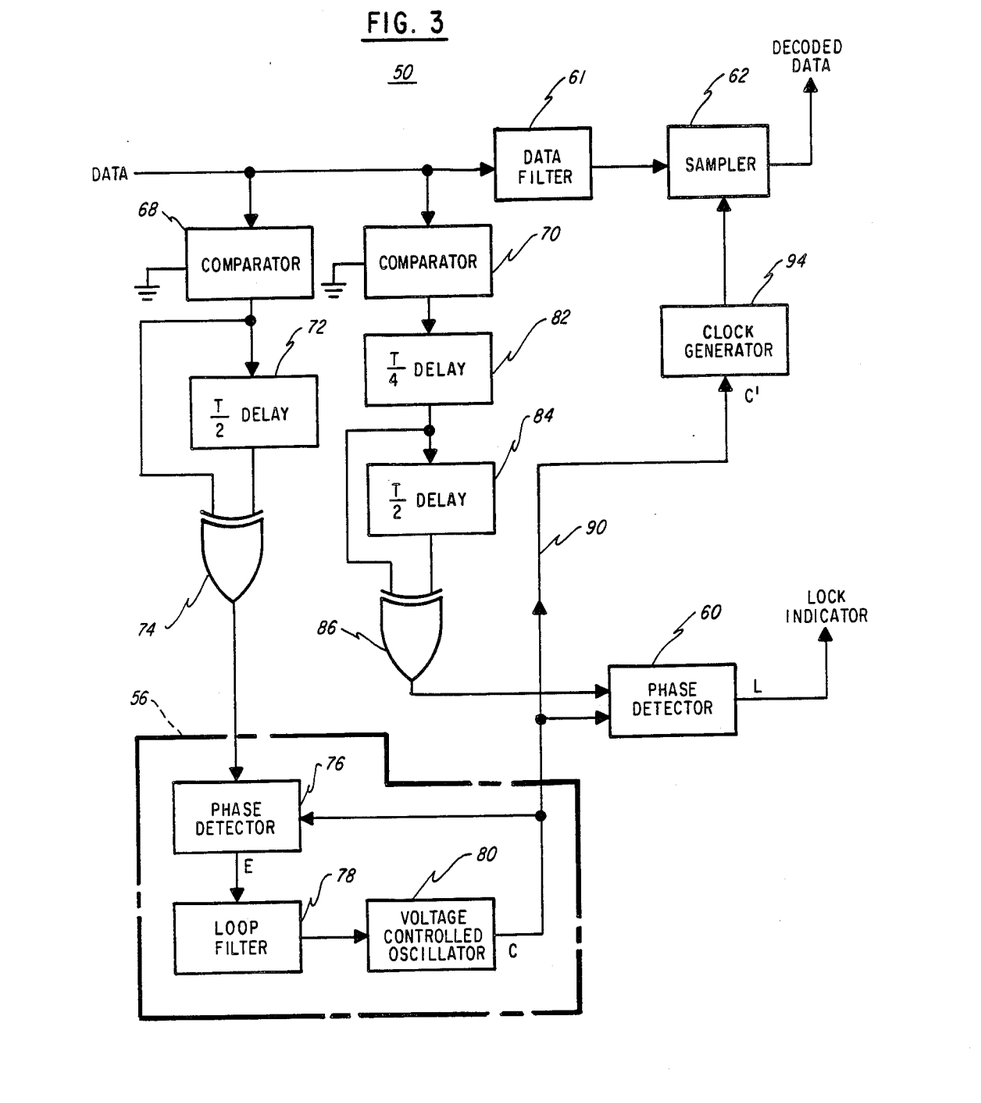
Figure 4:
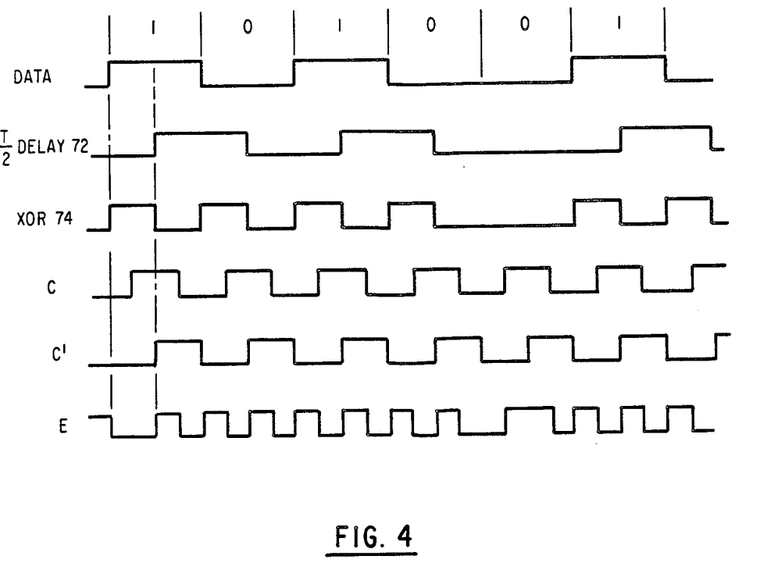
FIGS. 4-7 are timing diagrams associated with the bit synchronizer illustrated in FIG. 3.

FIG. 3 illustrates another and more detailed embodiment of the bit synchronizer 50. The data stream is input to comparators 68 and 70 for squaring-up the edges of the data signal. From the comparator 68, the signal is input to a T/2 delay 72. T is the bit time, and thus the T/2 delay 72 delays the data signal by one-half of a bit interval. In an EXCLUSIVE OR gate 74 (a form of phase detector in this embodiment) the delayed signal from the T/2 delay 72 is combined with the undelayed signal from the comparator 68. The output signal from the EXCLUSIVE OR gate 74 is a clock signal having one pulse for each data transition. However, as can be seen in FIG. 4, a clock pulse is not produced when the data does not transition between successive bit intervals. This signal is identical to the signal produced by the bit rate clock generator 54 in FIG. 2.

The data signal, the output signal from the T/2 delay 72, and the output signal from the EXCLUSIVE OR gate 74 are shown in the FIG. 4 timing diagram.

The signal from the EXCLUSIVE OR gate 74 is input to the phase-locked loop 56, which comprises a phase detector 76, a loop filter 78, and a voltage controlled oscillator 80. The phase detector 76 compares the signals from the EXCLUSIVE OR gate 74 and the voltage controlled oscillator 80 to produce an error signal, designated the E signal. The signal from the voltage controlled oscillator 80 is designated the C signal. Both the E and C signals are also illustrated in FIG. 4. Note that the average value of the E signal is zero in FIG. 4 because the output signal from the EXCLUSIVE OR gate 74 is 90° out of phase with the C signal. The E signal, after filtering in the loop filter 78, controls the voltage controlled oscillator 80 in such a manner to bring the C signal into a 90° phase relationship with the signal from the EXCLUSIVE OR gate 74.

The data stream is also input to the data filter 61 for removing noise, and thus improving the likelihood of correct bit detection. The C signal from the voltage controlled oscillator 80 controls the sampler 62 such that the data stream is sampled at each pulse in the C signal, preferably at the leading edge of each such pulse. To place the leading edge of each pulse in the C signal at the mid-point position, it is necessary to delay the C signal by 90°. This is accomplished in a delay line 90, which produces a signal C', shown in FIG. 4. Depending on the characteristics of the sampler 62, it may be necessary to include a clock generator 94, which will provide an appropriately shaped clock signal for the sampler 62.

Referring to FIG. 4, note that the leading edge of C' pulses occur at the mid-bit of each data bit and thus the data stream is decoded in such a manner to maximize the coding accuracy and minimize the bit error rate.

When the E signal is filtered in the loop filter 78 a dc value is produced for controlling the voltage controlled oscillator 80. As can be seen in FIG. 4, when the average value of the E signal is constant, indicating phase coherency, the signal from the loop filter 78 will also be constant and there will be no change induced in the C signal.

Figure 5:
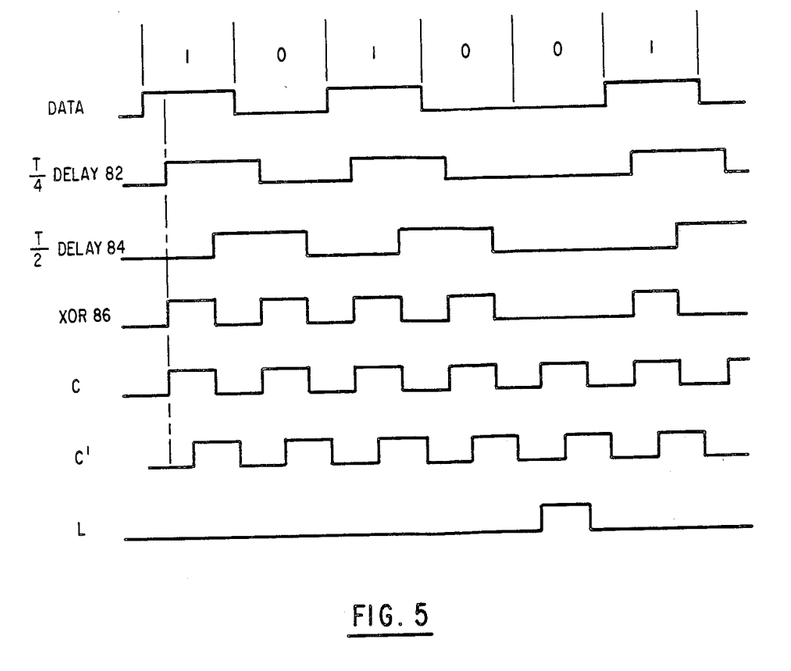

The squared-up signal from the comparator 70 is input to a T/4 delay 82 and a T/2 delay 84. The delayed signal from the T/4 delay 82 is processed in an EXCLUSIVE OR gate 86 with the delayed signal from the T/2 delay 84. Each of these signals is shown in the timing diagram of FIG. 5. In the phase detector 60 the output signal from the EXCLUSIVE OR gate 86 is phase-compared with the C signal from the voltage controlled oscillator 80. Both these signals and the resultant signal L from the phase detector 60 are also illustrated in FIG. 5. Note that except when there is a low transition density, the L signal will have a constant dc value, indicating a locked condition. Thus, if averaged over a long period the L signal will be constant.

Figure 6:
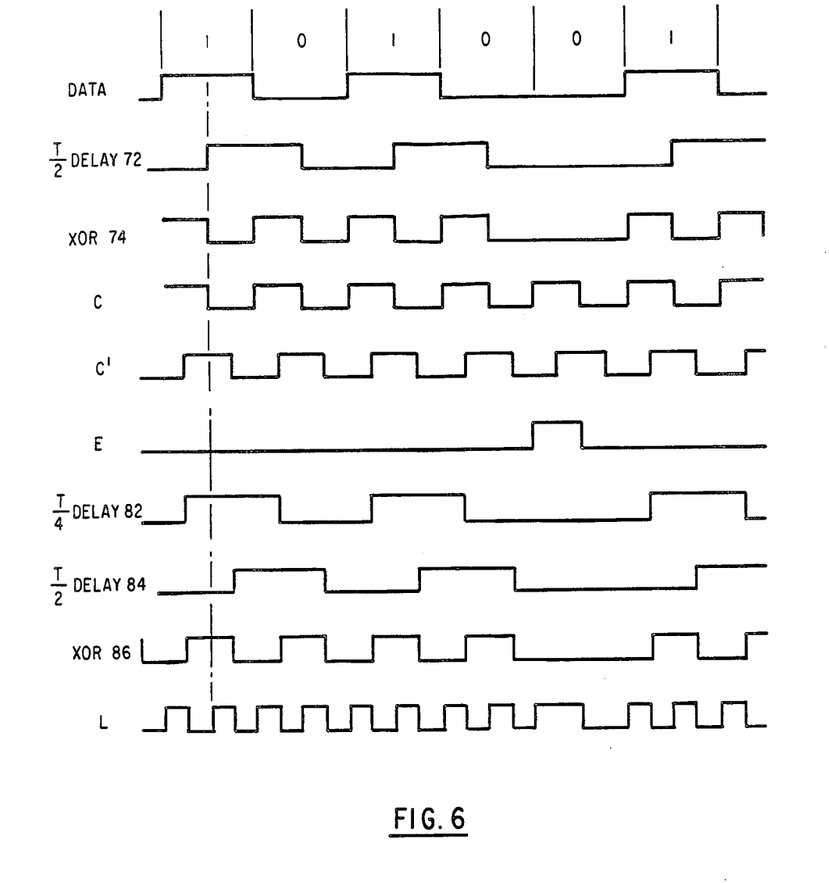

FIG. 6 illustrates the timing waveforms when the signal C is shifted back 90°. That is, observe that in FIGS. 4 and 5 the rising clock signal edge occurs 90° after the data rising edge, but in FIG. 6, these two edges occur at the same time. As would be expected, when the clock is shifted as shown in FIG. 6, the average value of the error signal E has a dc component that controls the voltage controlled oscillator 80 to shift the clock ahead 90° so that it appears as shown in FIG. 4. In contrast to FIG. 6, note that the E signal in FIG. 4 averages to zero and thus has no effect on the voltage controlled oscillator 80 and the clock signal C. Continuing further with FIG. 6, note that the lock signal L has an average value of zero, indicating that the bit synchronizer 50 is not in a locked condition.

Figure 7:
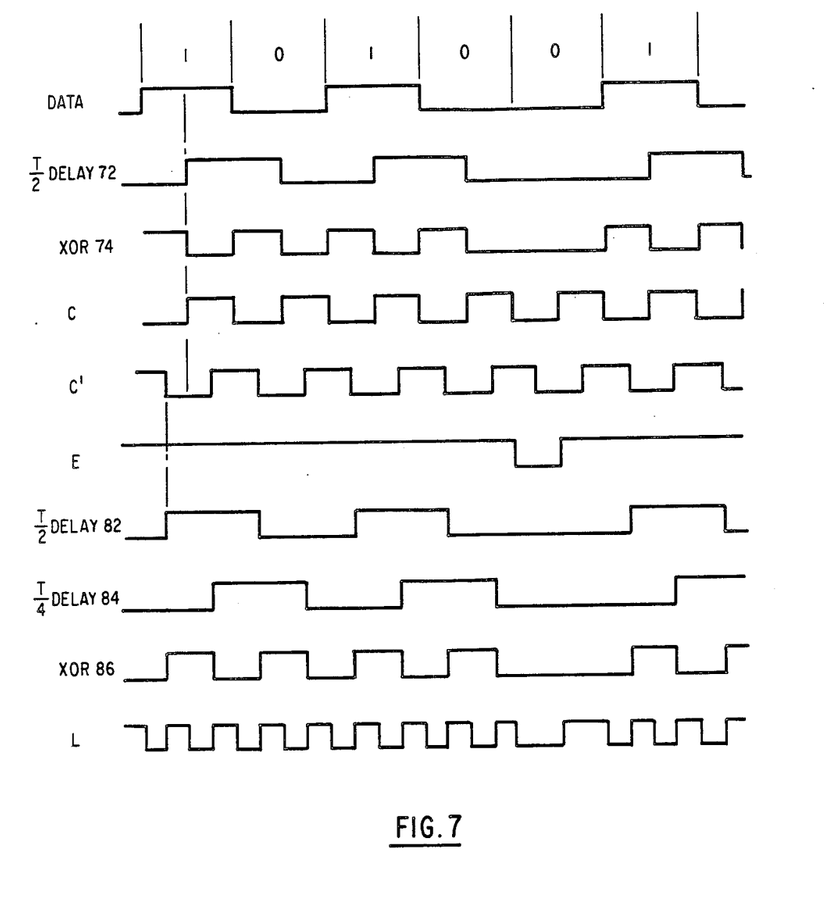

FIG. 7 shows the same data waveforms under the condition that the clock signal C is shifted ahead 90°. Note again that the error signal E has a dc component, which has an opposite sign to that shown in FIG. 6. Again, the lock signal L has an average value of zero, indicating that the locked condition has not been achieved.

Depending upon the type of lock indicator used (for instance a lamp, a light emitting diode, or an audible device) it may be necessary to integrate the lock signal L over a long time to avoid problems of a low transition density. Such a problem occurs in FIG. 5 at the point where there are two consecutive zeros in the data stream.

Figure 8:
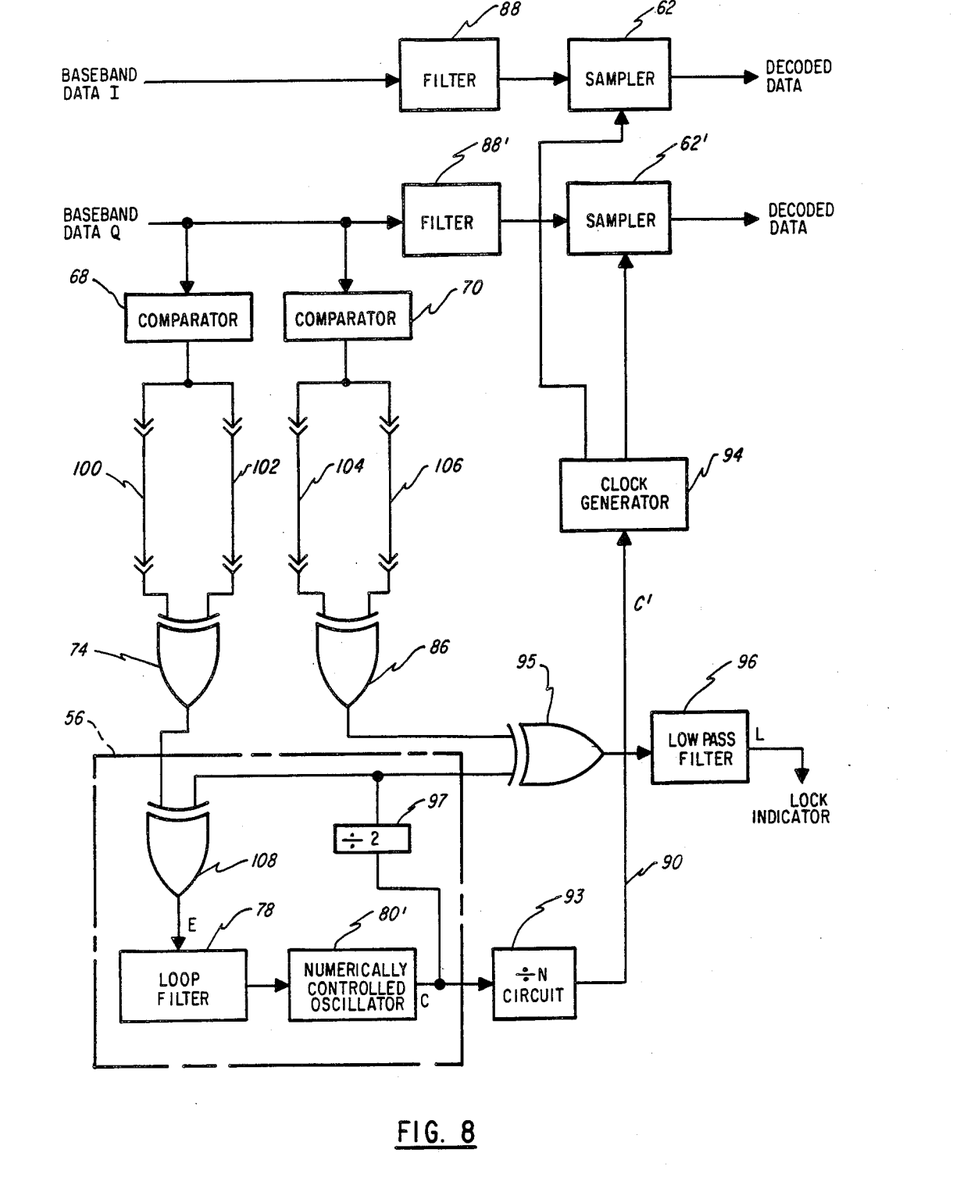
FIGS. 8 and 9 are block diagrams of other embodiments of the present invention.

FIG. 8 illustrates another embodiment of the present invention wherein baseband data is available on the well-known I and Q channels for decoding. The T/2 and T/4 delays illustrated in the prior embodiments are implemented with delay lines 100, 102, 104, and 106, which are cut to length to implement the T/2 and T/4 delays. For example, the delay line 100 may have a length designated 1 and a predetermined delay associated therewith. The delay line 102 will then be cut to a length 1+x where x would provide a T/2 delay. Similarly, the delay line 104 would have a length 1+y, where y provides a T/4 delay. The delay line 106 has a length 1+z where z provides a 3T/4 delay. In the FIG. 8 embodiment the phase detector 76 is implemented with an EXCLUSIVE OR gate 108. Thus the voltage controlled oscillator 80 of FIG. 3 is in fact a numerically controlled oscillator 80' in FIG. 8. The FIG. 8 embodiment also includes a ÷N circuit 93 for changing the frequency of the C signal as required and a ÷2 circuit 97. The phase detector 60 of FIG. 3 is implemented with an EXCLUSIVE OR gate 95 in FIG. 8. Also, FIG. 8 includes a low-pass filter 96 that receives the output signal from the EXCLUSIVE OR gate 95. The low pass filter 96 may be required in those embodiments where a low transition density is expected.

Figure 9:
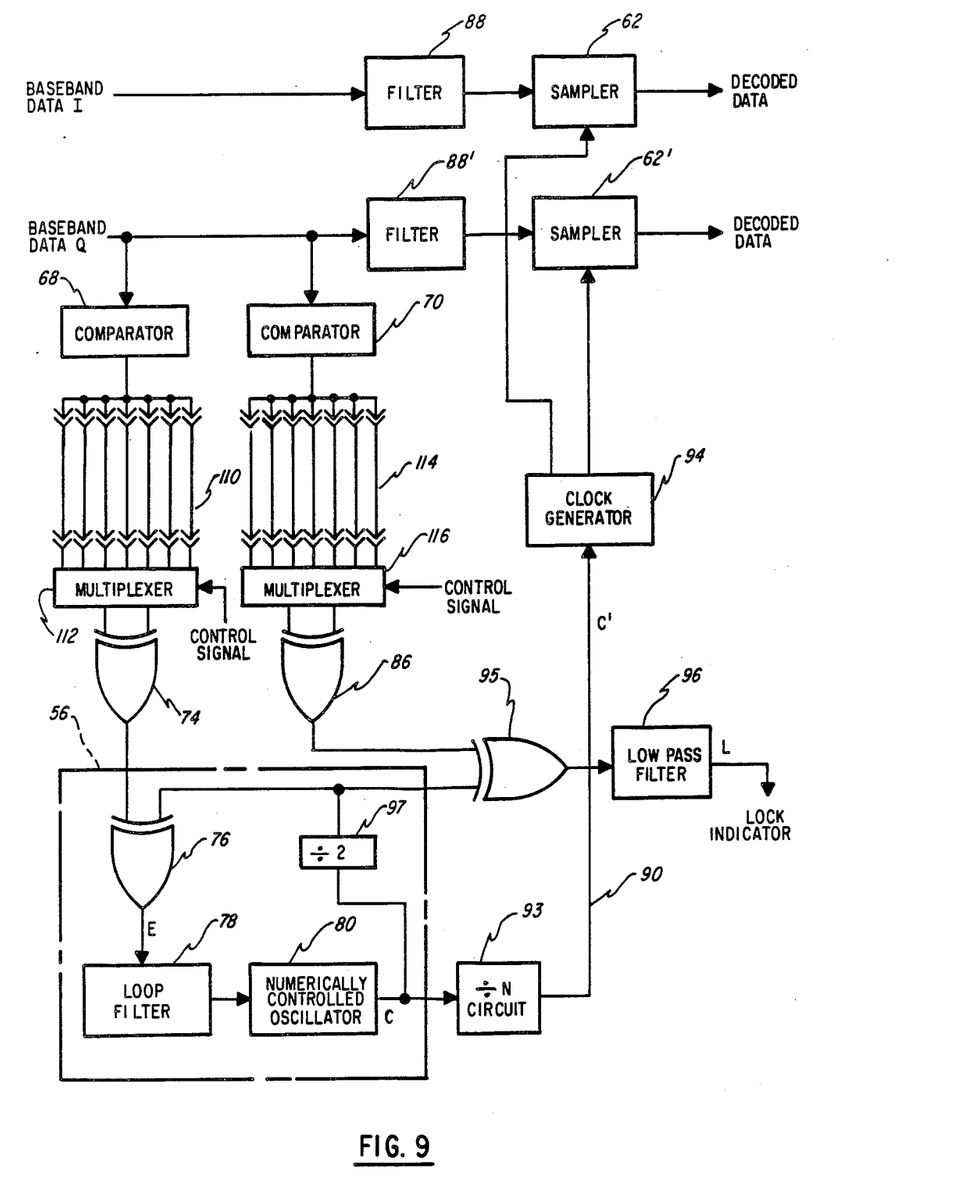

FIG. 9 is similar to FIG. 8 with the exception of replacing the delay lines 100, 102, 104, and 106 with two pluralities of delay lines designated 110 and 114. The delay lines 110 are input to a multiplexer 112. The multiplexer 112 is responsive to a control signal for choosing which two of the delay lines from among the plurality of delay lines 110 is required, based on the bit rate of the baseband data I and Q signals. Similarly, a multiplexer 116 is connected to the plurality of delay lines 114 and controlled by a control signal to select the appropriate two of the plurality of delay lines 114, based on the bit rate of the received data stream.

While several embodiments in accordance with the present invention have been shown and described, it is understood that the same is not limited thereto but is susceptible of numerous changes and modifications as known to a person skilled in the art, and I therefore do not wish to be limited to the details shown and described herein, but intend to cover all such changes and modifications as are obvious to one of ordinary skill in the art.

What is claimed is:

1. Apparatus for producing a clock signal synchronized to a received digital data signal, comprising:

means responsive to the received digital data signal for generating a first and a second bit rate clock wherein said first and said second bit rate clocks have a predetermined phase difference there between;

means for providing a local oscillator signal;

means for comparing said first bit rate clock with said local oscillator signal and for producing a control signal in response thereto;

means for applying said control signal to said means for providing said local oscillator signal so as to phase synchronize said local oscillator signal and said first bit rate clock;

means for shifting said second bit rate clock to produce a shifted bit rate clock;

and means for comparing said local oscillator signal with said shifted bit rate clock and for indicating a synchronized condition when said local oscillator signal and said shifted bit rate clock are in phase synchronization.

2. The apparatus of claim 1 including a means, responsive to the received digital data signal for squaring up the edges thereof, and wherein said squared up digital data signal is input to the means for generating the first and the second bit rate clocks.

3. The apparatus of claim 1 wherein the means for generating the first and the second bit rate clocks includes:

a first delay means responsive to the digital data signal for imposing a delay of T/2 therein, wherein T represents the time occupied by one bit interval of the digital data signal, and wherein said first delay means produces a first delayed signal;

first EXCLUSIVE OR gate means responsive to said first delayed signal and the digital data signal for producing the first bit rate clock;

a second delay means responsive to the digital data signal for imposing a delay of T/4 therein and for producing a second delayed signal;

third delay means responsive to said second delayed signal for imposing a delay of T/2 therein and for producing a third delayed signal;

second EXCLUSIVE OR gate means responsive to said second and said third delayed signals for producing the second bit rate clock.

4. The apparatus of claim 3 wherein the first, the second and the third delay means include delay lines cut to a predetermined length so as to impose the required delays.

5. The apparatus of claim 3 wherein the first delay means includes a plurality of delay lines having different lengths, and including a multiplexer means and means for providing a control signal, wherein said control signal is input to said multiplexer means for selecting the appropriate delay line based on the value of T for the received digital data signal.

6. The apparatus of claim 3 wherein the second and the third delay means include a plurality of delay lines of different lengths, and including a multiplexer means, and means for providing a control signal, wherein said control signal is input to said multiplexer means for selecting the correct delay line from among said plurality of delay lines based on the value T for the received digital data signal so as to impose the correct delay therein.

7. The apparatus of claim 1 wherein the means for comparing the local oscillator signal with the shifted bit rate clock produces a signal indicating a locked condition, wherein said signal has a constant dc value over a long time, and including a low-pass filter responsive to said signal for averaging said signal.

8. Apparatus for producing a timing signal synchronized to a digital data signal, comprising:
   means responsive to the received digital data signal for generating a first and a second bit rate signal wherein said first and second bit rate signals have a predetermined phase difference there between;
   means for providing a local timing signal;
   means for comparing said first bit rate signal with said local timing signal and for producing a control signal in response thereto;
   means for applying said control signal to said means for providing said local timing signal so as to phase synchronize said local timing signal and said first bit rate signal;
   means for shifting said second bit rate signal to produce a shifted bit rate signal;
   and means for comparing said local timing signal with said shifted bit rate signal and for indicating a synchronized condition when said local timing signal and said shifted bit rate signal are in phase synchronization.

9. Apparatus for producing a clock signal for use in decoding a digital data signal and for synchronizing the clock signal to the digital data signal, comprising:
   means responsive to the digital data signal for generating a first and a second bit rate clock;
   means for providing a local oscillator signal;
   means for comparing said first bit rate clock with said local oscillator signal and for producing a control signal in response thereto;
   wherein said control signal controls said means for producing said local oscillator signal so as to phase synchronize said local oscillator signal and said first bit rate clock;
   sampler means responsive to the digital data signal wherein said local oscillator signal is input to said sampler means for controlling the decoding of the digital data signal;
   means for phase shifting said second bit rate clock to produce a shifted bit rate clock;
   and means for comparing said local oscillator signal with said shifted bit rate clock and for indicating a synchronized condition when said local oscillator signal and said shifted bit rate clock are in phase synchronization.

* * * * *